(12) United States Patent
Fujiyoshi et al.

(10) Patent No.: US 8,094,469 B2
(45) Date of Patent: Jan. 10, 2012

(54) CURRENT BALANCED PUSH-PULL INVERTER CIRCUIT

(75) Inventors: Toshikazu Fujiyoshi, Osaka (JP); Hajime Katsushima, Osaka (JP); Kenji Morimoto, Osaka (JP); Satoshi Yamamura, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 271 days.

(21) Appl. No.: 12/599,310

(22) PCT Filed: Nov. 27, 2008

(86) PCT No.: PCT/JP2008/071504
§ 371 (c)(1),
(2), (4) Date: Nov. 9, 2009

(87) PCT Pub. No.: WO2010/061442
PCT Pub. Date: Jun. 3, 2010

(65) Prior Publication Data
US 2011/0280054 A1 Nov. 17, 2011

(51) Int. Cl.
*H02M 3/335* (2006.01)
*H02M 7/538* (2006.01)
(52) U.S. Cl. .............. 363/24; 363/17; 363/133
(58) Field of Classification Search .......... 363/16, 363/17, 24, 25, 26, 98, 132, 133, 134
See application file for complete search history.

(56) References Cited

U.S. PATENT DOCUMENTS 4,797,630 A * 1/1989 Brown ............ 330/264
4,926,302 A * 5/1990 Harada et al. ............ 363/16

(Continued)

FOREIGN PATENT DOCUMENTS

JP 51-133731 11/1976

(Continued)

OTHER PUBLICATIONS

International Search Report for corresponding International Application No. PCT/JP2008/071504 mailed Feb. 17, 2009 and English translation (previously listed on IDS submitted with application on Nov. 9, 2009).

(Continued)

*Primary Examiner* — Gary L Laxton
*Assistant Examiner* — Zekre Tsehaye
(74) *Attorney, Agent, or Firm* — Renner, Otto, Boisselle & Sklar, LLP (57) ABSTRACT

This inverter circuit includes first and second switching elements and an output transformer which has a first primary winding connected in series between the first switching element and the second switching element and a second primary winding for obtaining an output voltage. The inverter circuit also includes a first voltage source, a second voltage source, and a control unit. The first voltage source is connected between a first connection point at which the first primary winding is connected to the second switching element, and the first switching element, and applies a voltage to the first switching element via the first primary winding. And the second voltage source is connected between a second connection point at which the first primary winding is connected to the first switching element, and the second switching element, and applies a voltage to the second switching element via the first primary winding. The control unit alternately turns the first switching element and the second switching element ON and OFF. And this inverter circuit also may include first and second recovery snubber circuits for recovering electrical charge in snubber capacitors.

5 Claims, 11 Drawing Sheets

U.S. PATENT DOCUMENTS

| | | | |
|---|---|---|---|
| 6,018,203 A * | 1/2000 | David et al. | 307/52 |
| 6,914,788 B2 * | 7/2005 | Fujiyoshi et al. | 363/16 |
| 7,956,569 B2 * | 6/2011 | Welchko et al. | 318/801 |

FOREIGN PATENT DOCUMENTS

| | | |
|---|---|---|
| JP | 02-254971 | 10/1990 |
| JP | 09-046144 | 2/1997 |
| JP | 2001-112253 | 4/2001 |
| JP | 2001-224172 | 8/2001 |
| JP | 2002-305897 | 10/2002 |
| JP | 2005-279774 | 10/2005 |
| JP | 2007-151225 | 6/2007 |

OTHER PUBLICATIONS

International Search Report for corresponding application No. PCT/JP2008/071504 to be provided.

* cited by examiner

CURRENT BALANCED PUSH-PULL INVERTER CIRCUIT

TECHNICAL FIELD

The present invention relates to an inverter circuit which has a novel structure, and which is different from an inverter circuit such as a full bridge type or a half bridge type or the like.

BACKGROUND ART

Figure 5:
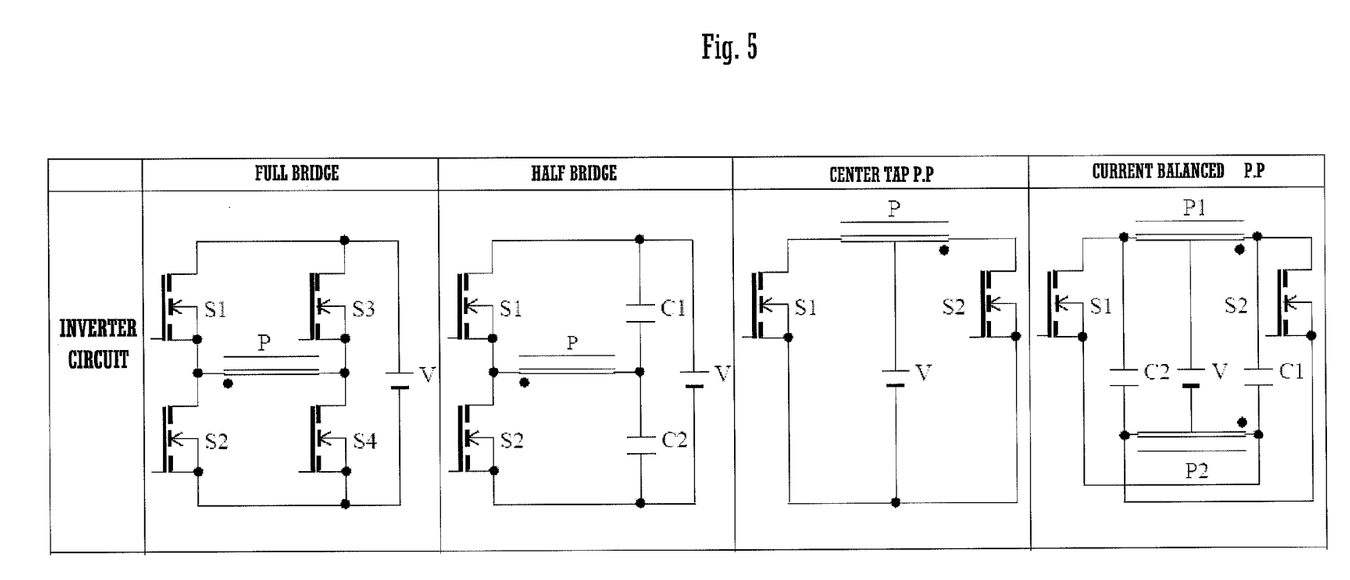
FIG. 5 is a figure showing the concept of inverter circuits of the full bridge type, the half bridge type, the center tap push-pull type, and this current balanced push-pull type.

A full bridge type inverter circuit, a half bridge type inverter circuit, and a center tap push-pull type inverter circuit are inverter circuits which are well known from the prior art. A figure demonstrating the concepts of these inverter circuits is shown in FIG. 5.

With the full bridge type, switching elements S1 through S4 are connected in a bridge, and a power supply V is connected between the bridge. The switching elements S1 and S4, and the switching elements S2 and S3, are alternately turned ON and OFF, so that an alternating electrical current flows in the primary winding P of an output transformer (refer to Patent Document #1).

With the half bridge type, voltage sources C1 and C2 are respectively connected in parallel to switching elements 51 and S2, and the power supply V is connected between the voltage sources C1 and C2. The switching elements S1 and S2 are alternately turned ON and OFF, so that an alternating electrical current flows in the primary winding P (refer to Patent Document #2).

With the center tap push-pull type, the power supply V is connected to the center tap of the primary winding P, which is connected between the switching elements S1 and S2. The switching elements S1 and S2 are alternately turned ON and OFF, so that an alternating electrical current flows in the primary winding P (refer to Patent Document #3).

Patent Document #1: Japanese Patent Laying-Open Publication 2007-151225.
Patent Document #2: Japanese Patent Laying-Open Publication 2005-279774.
Patent Document #3: Japanese Patent Laying-Open Publication 2001-112253.

DISCLOSURE OF INVENTION

Problems to be Solved by the Invention

However, the various types of inverter circuit described above suffer from inconveniences, due to the following points:

(1) The Full Bridge Type

Since it is necessary to use four switching elements, the cost becomes high.

(2) The Half Bridge Type

Although two switching elements are sufficient, the electrical currents which flow in these switching elements S1 and S2 and in the primary winding P become twice as great, as compared with the full bridge type or the center tap push-pull type. Due to this, it is not possible to avoid size increase and high price of the switching elements and of the transformer.

(3) The Center Tap Push-Pull Type

Two switching elements are sufficient, and the electrical currents which flow in these switching elements S1 and S2 and in the primary winding P do not become as great as with the full bridge type. However, since the power supply V is connected to the center tap of the primary winding P, accordingly a leakage inductance is interposed between the combination of the left and right windings P. Due to this, a surge voltage which is generated when the first switching element is turned OFF is clamped via the leakage inductance described above by a freewheel diode which is connected to the second switching element. But, since the leakage inductance described above is present, it is not possible to obtain perfect clamping, and there is the inconvenience that an excessively great surge voltage is applied to the first switching element.

The object of the present invention is to provide an inverter circuit with which two switching elements are sufficient, in which the value of the electrical current which flows in the switching elements is low, and moreover in which no excessively great surge voltage is applied to the switching elements.

Means for Solving Problem

Figure 1:
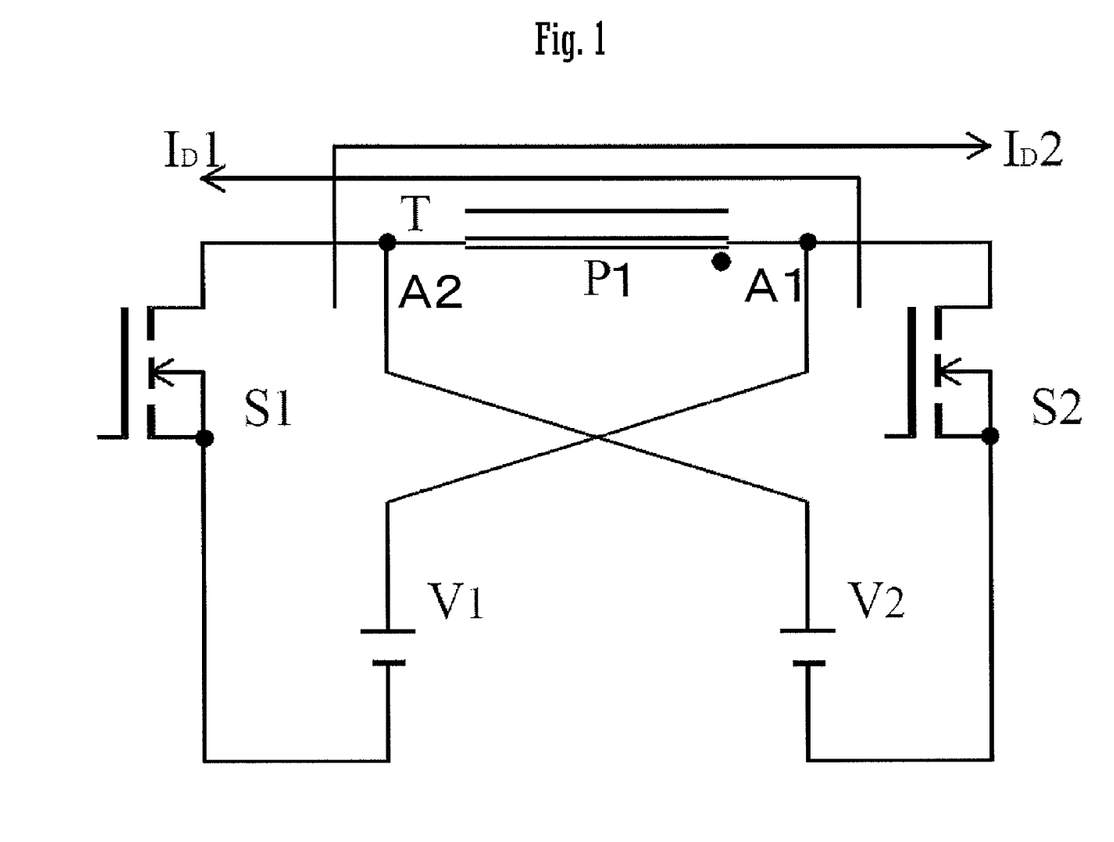
FIG. 1 is a figure showing the concept of the current balanced push-pull type (Current Balanced P.P. type) inverter circuit of the present invention.

The inverter circuit according to the present invention has a structure as shown in FIG. 1. As switching elements, this inverter circuit comprises a first switching element S1 and a second switching element S2. These switching elements are semiconductor switching elements, and may for example consist of IGBTs (insulated gate type bipolar transistors) or MOS-FETs. Moreover, this inverter circuit includes an output transformer which has a first primary winding P1 which is connected in series between the first switching element S1 and the second switching element S2, and which moreover has a secondary winding for obtaining an output voltage. As one example of connection, the first primary winding P1 is connected to the positive electrode sides of the first switching element S1 and the second switching element S2. Moreover, this inverter circuit includes two voltage sources (in FIG. 1, the voltage sources are shown as power supplies). A first power supply V1 which is the first voltage source is connected between a first connection point A1 at which the first primary winding P1 is connected to the second switching element S2, and the first switching element S1. Due to this, the first power supply V1 applies voltage to the first switching element S1 via the first primary winding P1. And the second power supply V2 is connected between a second connection point A2 at which the first primary winding P1 is connected to the first switching element S1, and the second switching element S2. Due to this, the second power supply V2 applies voltage to the second switching element S2 via the first primary winding P1.

The control unit performs control to alternately turn the first switching element S1 and the second switching element S2 ON and OFF.

In this specification, an inverter circuit which has the above structure is termed a current balanced push-pull (Current Balanced P.P.) inverter circuit.

Figure 2:
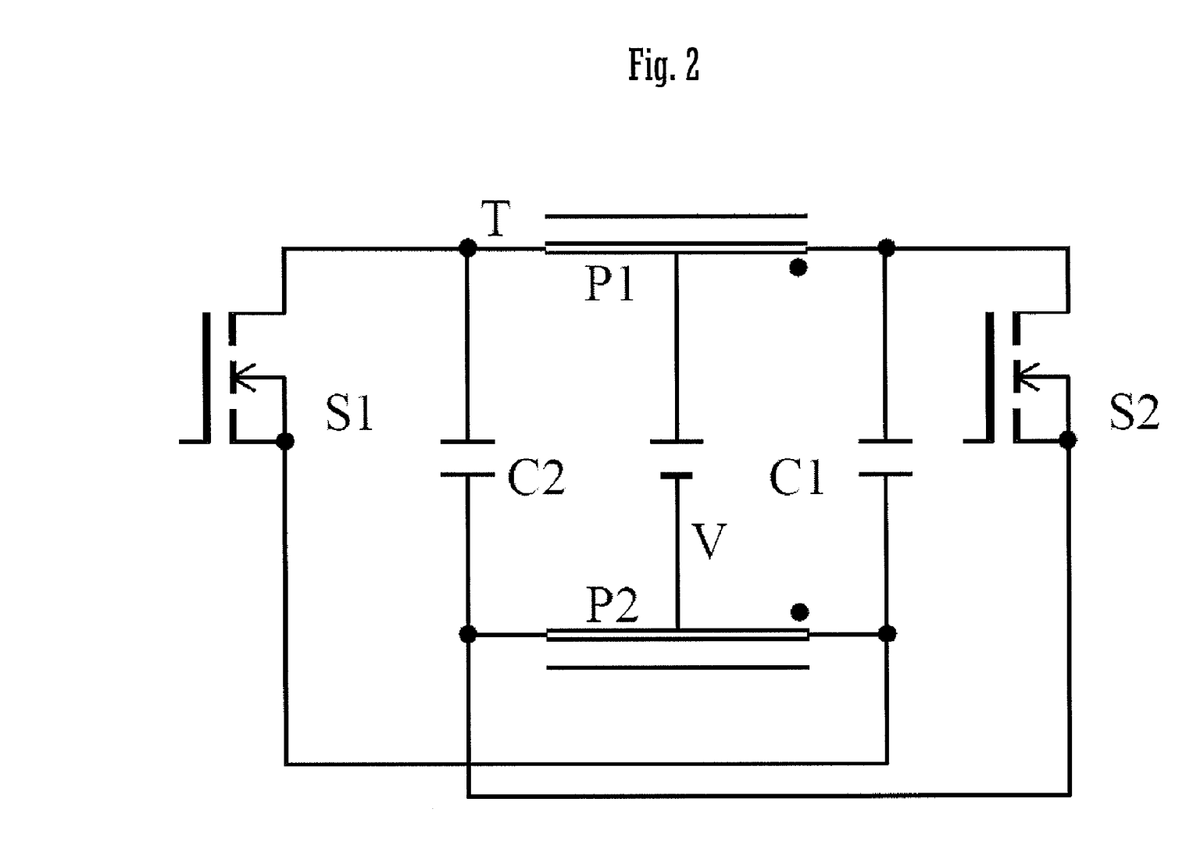
FIG. 2 shows a first embodiment of the present invention.

A variant embodiment of the inverter circuit described above may have the following structure, as shown in FIG. 2.

That is, the positive electrode side of the first voltage source (in FIG. 2, the capacitor C1) is connected to the first connection point, while the positive electrode side of the second voltage source (in FIG. 2, the capacitor C2) is connected to the second connection point; and, moreover, a second primary winding P2 is provided, connected between the negative electrode side of the first voltage source and the negative electrode side of the second voltage source. Furthermore, a power supply V is provided which is connected between a center tap of the first primary winding P1 and a center tap of the second primary winding P2, and which supplies energy to the first and second voltage sources via the first primary winding P1 and the second primary winding P2.

With the structure described above, charging electrical current always flows (i.e., energy is always supplied) from the power supply V to the first voltage source and the second voltage source. When the first switching element S1 is turned ON, the electrical current component which flows from the first voltage source to the first switching element S1 via the first primary winding P1, and the electrical current component which flows from the second voltage source to the first switching element S1 via the second primary winding P2, are combined together, and this combined electrical current flows in the first switching element S1. To put it in another manner, the electrical current which flows in the first switching element is divided (shunted) between the first primary winding P1 and the second primary winding P2.

By providing a snubber circuit and a recovery circuit to the inverter circuit of this invention, it becomes possible to obtain ZVS (Zero Voltage Switching) operation, and moreover it is possible to reduce the losses. The snubber circuit consists of a first snubber circuit which includes a series circuit of a first snubber diode and a first snubber capacitor, connected in parallel with the first switching element S1, and a second snubber circuit which includes a series circuit of a second snubber diode and a second snubber capacitor, connected in parallel with the second switching element. The operation of the first snubber circuit is as follows.

When the first switching element S1 is turned OFF, due to the operation of the leakage inductance of the transformer, a charging electrical current flows to the first snubber capacitor, and the surge voltage component charges this capacitor up. Since the change of the charging voltage at this time is such that it gradually rises, the switching operation becomes ZVS operation. On the other hand since, when the first switching element is turned ON, the electrical current rises in a straight line slope shape due to the current reduction operation of the leakage inductance of the transformer, accordingly the switching operation becomes ZCS operation (Zero Current Switching) operation. At this time, due to the prevention operation of the first snubber diode, the electric charge in the first snubber capacitor is not discharged via the first switching element S1, but is recovered to the first voltage source by a first recovery circuit. It should be understood that, with a conventional snubber circuit which is not provided with any recovery circuit, a snubber resistor Rs1 is connected in parallel with the first snubber capacitor, so that the electric charge in the snubber capacitor is discharged through this snubber resistor Rs1. This discharge electrical current if is converted into heat by the snubber resistor Rs1 (if×if×Rs1). Due to this, with such a conventional snubber circuit which is not provided with any recovery circuit, the heat loss is large, so that the efficiency of the inverter circuit becomes low.

However, with this invention, no such snubber resistor Rs1 is connected, but rather the first recovery circuit is provided. With this first recovery circuit, the electric charge in the first snubber capacitor is recovered to the first voltage source.

The first recovery circuit is connected between the positive electrode side of the first voltage source and the first snubber capacitor. This first recovery circuit includes a third switching element S3, a first reactor which is connected between the third switching element S3 and the positive electrode side of the first voltage source, and a first recovery diode which is connected between the third switching element S3 and the first snubber capacitor, and which prevents charging of the first snubber capacitor. The control unit performs control to turn the third switching element S3 ON within the ON interval of the first switching element S1. Due to this, the electric charge which has accumulated in the first snubber capacitor is recovered to the first voltage source. Due to this recovery, this inverter circuit can have high efficiency.

The second snubber circuit and the second recovery circuit have the same structures as the first snubber circuit and the first recovery circuit described above.

Effects of the Invention

According to the present invention, two switching elements are sufficient and the value of the electrical current which flows in the switching elements is low, and moreover no excessively great surge voltage is applied to the switching elements. Furthermore, by connecting the snubber circuits and the recovery circuits, it is possible to make the switching elements operate by ZVS operation, and moreover it is possible to reduce the losses.

EXPLANATION OF REFERENCE NUMBERS

C1—capacitor which constitutes a first voltage source
C2—capacitor which constitutes a second voltage source
V—power supply
S1—first switching element
S2—second switching element
S3—third switching element
S4—fourth switching element
P1—first primary winding
P2—second primary winding
INV—inverter circuit
SN1—first recovery snubber circuit
SN2—second recovery snubber circuit
OUT—output circuit

BEST MODE FOR CARRYING OUT THE INVENTION

FIG. 1 is a figure showing the concept of the current balanced push-pull type (Current Balanced P.P. type) inverter circuit of the present invention.

This inverter circuit comprises a first switching element S1, a second switching element S2, and an output transformer (not shown in the drawings) having a first primary winding P1 which is connected in series between the first switching element S1 and the second switching element S2, and also having a secondary winding for obtaining an output voltage.

Furthermore, in this inverter circuit, there are provided: a first power supply V1 which is connected between a first connection point A1 at which the first primary winding P1 is connected to the second switching element S2 and the first switching element S1, and which applies voltage to the first switching element S1 via the first primary winding P1; and a second power supply V2 which is connected between a second connection point at which the first primary winding P1 is connected to the first switching element S1 and the second switching element S2, and which applies voltage to the second switching element S2 via the first primary winding P1.

The first switching element S1 and the second switching element S2 are alternately turned ON and OFF by a control unit, not shown in the figures.

In the inverter circuit described above, when the first switching element S1 is turned ON, an electrical current $I_D1$ from the first power supply V1 flows in the first primary winding P1 in the leftwards direction; and, when the second switching element S2 is turned ON, an electrical current $I_D2$ from the second power supply V2 flows in the first primary winding P1 in the rightwards direction. Since, by turning the first switching element S1 and the second switching element S2 alternately ON and OFF, these electrical currents $I_D1$ and $I_D2$ flow in the first primary winding P1 alternately, accordingly an AC output voltage is generated in the secondary winding of the transformer.

FIG. 2 shows a first embodiment of the present invention. This embodiment is an inverter circuit which employs two primary windings.

In this inverter circuit, the first power supply V1 of FIG. 1 is replaced by a capacitor C1 which constitutes a first voltage source, and the second power supply V2 of FIG. 1 is replaced by a capacitor C2 which constitutes a second voltage source.

Moreover, a second primary winding P2 is connected between the negative electrode side of the first voltage source C1 and the negative electrode side of the second voltage source C2.

And a power supply V is provided between a center tap of the first primary winding P1 and a center tap of the second primary winding P2, and supplies energy to the first voltage source C1 and the second voltage source C2 via the first primary winding P1 and the second primary winding P2.

Figure 3:
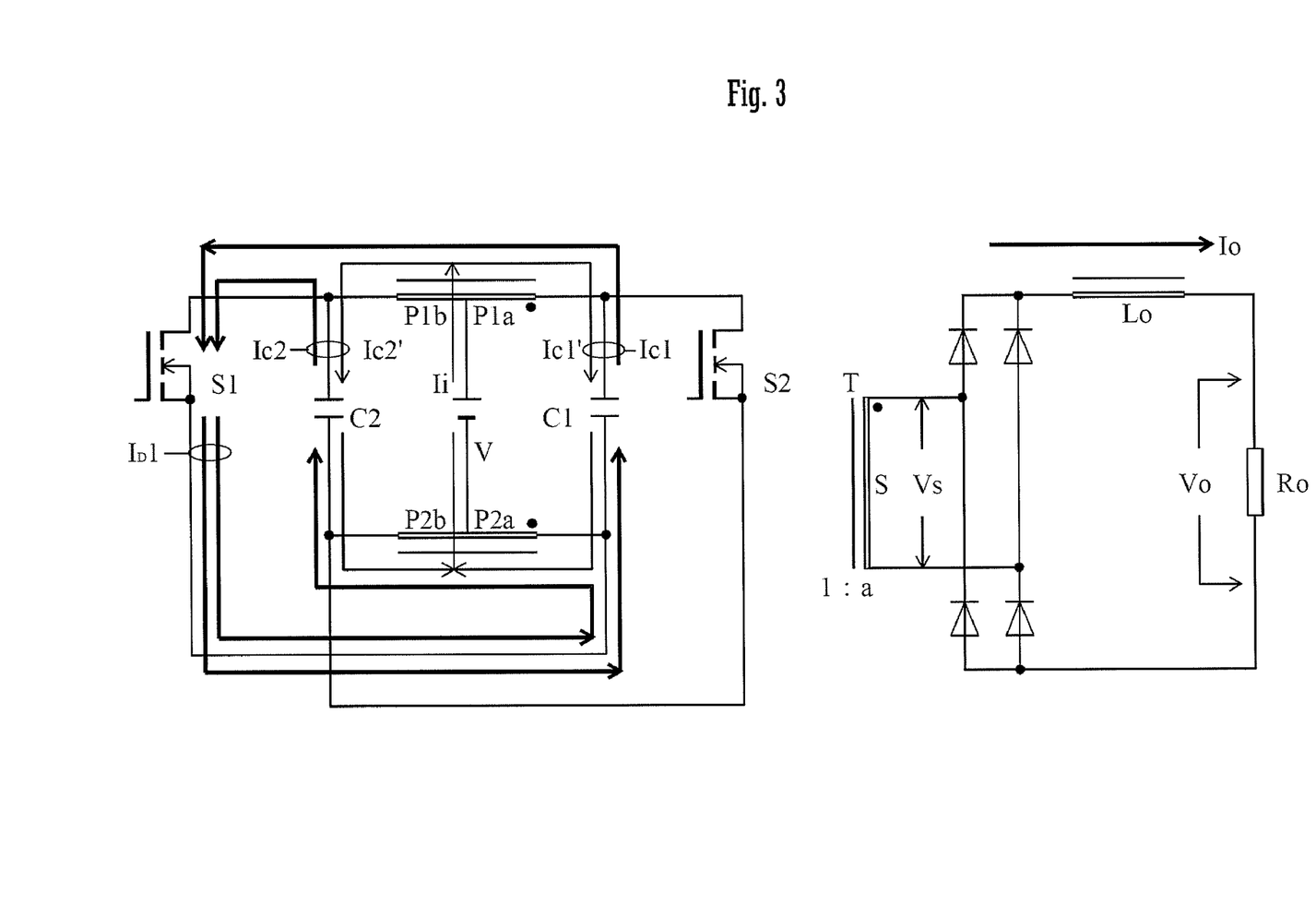
FIG. 3 is a figure for explanation of the operation of this inverter circuit.
Figure 4:
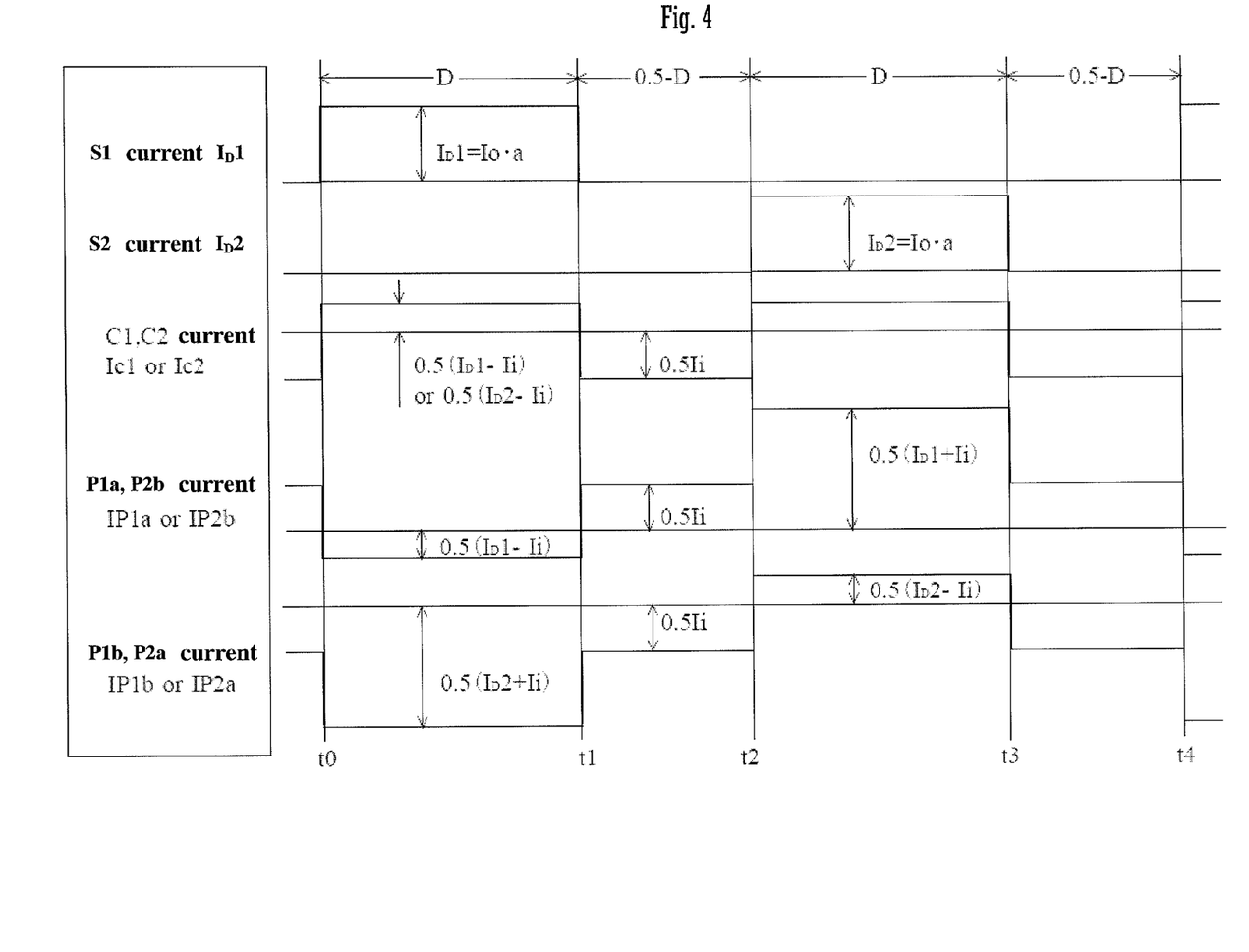
FIG. 4 is a time chart for this inverter circuit.

FIG. 3 is a figure for explanation of the operation of this inverter circuit, and FIG. 4 is a time chart thereof. In FIG. 4, the interval D is the interval in which the first switching element S1 or the second switching element S2 is turned ON. Here, the maximum value of this interval D is 0.5. The interval (0.5−D) is the inactivity interval in which both of the switching elements S1 and S2 are turned OFF.

In FIG. 3, the first primary winding P1 consists of windings P1a and P1b which are centered about the center tap, and the second primary winding P1 consists of windings P2a and P2b which are centered about the center tap. It should be understood that a diode bridge rectification circuit is connected to the secondary winding S of the transformer T, thus overall constituting a DC-DC converter circuit; and moreover a reactor $L_O$ and a load $R_O$ which smooth the rectified output are connected. The other structures are the same as those of FIG. 2.

By turning the first switching element S1 ON, voltages V are applied to both the first primary winding P1 and the second primary winding P2 by the capacitor C1 which constitutes the first voltage source and the second capacitor C2 which constitutes the second voltage source, and, when an output voltage $V_s$ is generated in the secondary winding S, an output electrical current $I_O$ flows in the load $R_O$. Due to this, $0.5I_O \cdot a$ flows in both the primary windings P1 and P2 (the winding ratio of the transformer is 1:a). At this time, the electrical current $I_D1$ resulting from combination of the electrical current which flows in the switching element S1 from the capacitor C1 and the electrical current which flows in the switching element S1 from the capacitor C2 is:

$$I_D 1 = I_0 \cdot a$$

The electrical currents Ic1' and Ic2' which charge up the capacitors C1 and C2 are half (0.5Ii) of Ii, i.e. of their respective output electrical powers divided by the power supply voltage. Accordingly, the combined electrical currents Ic1 and Ic2 which flow into the capacitors C1 and C2 each become the discharge electrical current—the charging electrical current=$0.5(I_D 1-Ii)$ On the other hand, the electrical currents which flow in the primary windings P1a and P2b are obtained by the charging electrical current being subtracted, while the electrical currents which flow in the primary windings P1b and P2a are obtained by the charging electrical current being added. In other words:

$$IP1a, IP2b = 0.5(I_D 1 - Ii)$$

$$IP1b, IP2a = 0.5(I_D 1 + Ii)$$

This imbalance of electrical currents presents no problem. The reason for this is that, by alternatingly turning the switching elements S1 and S2 ON and OFF (i.e. by commutating them), an equilibrium of the average winding current is maintained. Accordingly, no problem arises such as the core of the transformer becoming magnetized.

Furthermore, as seen from the power supply V, the polarities of the windings P1a, P1b, P2a, and P2b are opposite to one another. Due to this, the transformer T is not directly excited by the power supply voltage. Moreover, since the charging electrical currents Ic1' and Ic2' which respectively flow in the primary windings P1 and P2 are opposite in direction, accordingly the problem of the core becoming DC magnetized also does not arise.

With the structure described above, the alternating voltages which are applied to the first primary winding P1 and the second primary winding P2 become the power supply voltage V, which is the same as with the full bridge type. Moreover, the center taps which are provided in the first primary winding P1 and the second primary winding P2 are for energy supply from the power supply V, and, by electrical current flowing as shown by the thick line in FIG. 3, both these windings, i.e. both the first primary winding P1 and the second primary winding P2, are utilized for the output electrical power supply. Due to this, no idling of either of the windings in each half cycle occurs, as with the center tap push-pull type. In other words, there is no need to consider the leakage inductance between P1a and P1b or the leakage inductance between P2a and P3b, and no surge voltage is generated upon commutation due to this. Accordingly, close coupling between P1a and P1b, P2a and P2b, or P1 and P2, with the objective of preventing surge voltages, is not required. Moreover, the charging electrical current 0.5Ii always flows from the power supply V to the capacitors C1 and C2 via the first primary winding P1 and the second primary winding P2. Since, during this charging, the leakage inductance between those windings P1 and P2 functions as a filter to eliminate the ripple component, accordingly the electrical current Ii which is supplied from the power supply V becomes continuous DC. Due to this, as the power supply V, it is possible to utilize a battery which is intolerant to ripple component (in other words, whose life characteristic in terms of ripple is bad), such as, for example, a fuel cell. It should be understood that the coupling between the first primary winding P1 and the secondary winding S, and the coupling between the second primary winding P2 and the secondary winding S, must be symmetrical, because it is necessary to equilibrate the current distribution.

FIG. 5 is a figure showing, for reference, the concepts of inverter circuits of the full bridge type, the half bridge type, the center tap push-pull type, and this current balanced push-pull type.

As explained above, with the current balanced push-pull type inverter circuit of this embodiment, there are the advantageous aspects that two switching elements are sufficient, that the electrical current which flows in each of the switching elements can be half as compared to the half bridge type, and that no excessively great surge voltage is applied to the switching elements. Moreover, for the power supply V, it is possible to utilize a battery which is averse to ripple component (i.e. whose lifetime characteristic with respect to ripple is bad), for example a fuel cell.

Next, a second embodiment of the present invention will be described.

Figure 6:
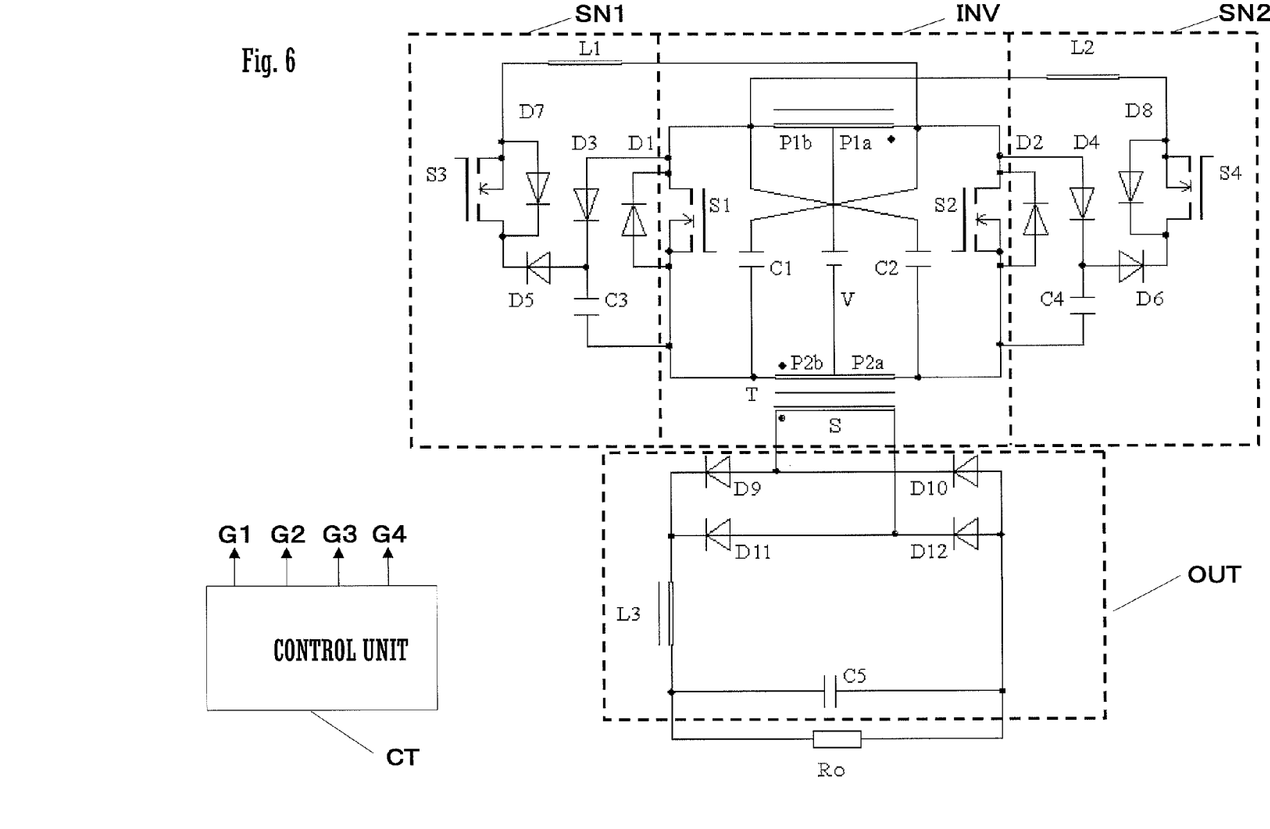
FIG. 6 is a circuit diagram of a DC-DC converter circuit which employs a current balanced push-pull type inverter circuit.
Figure 7:
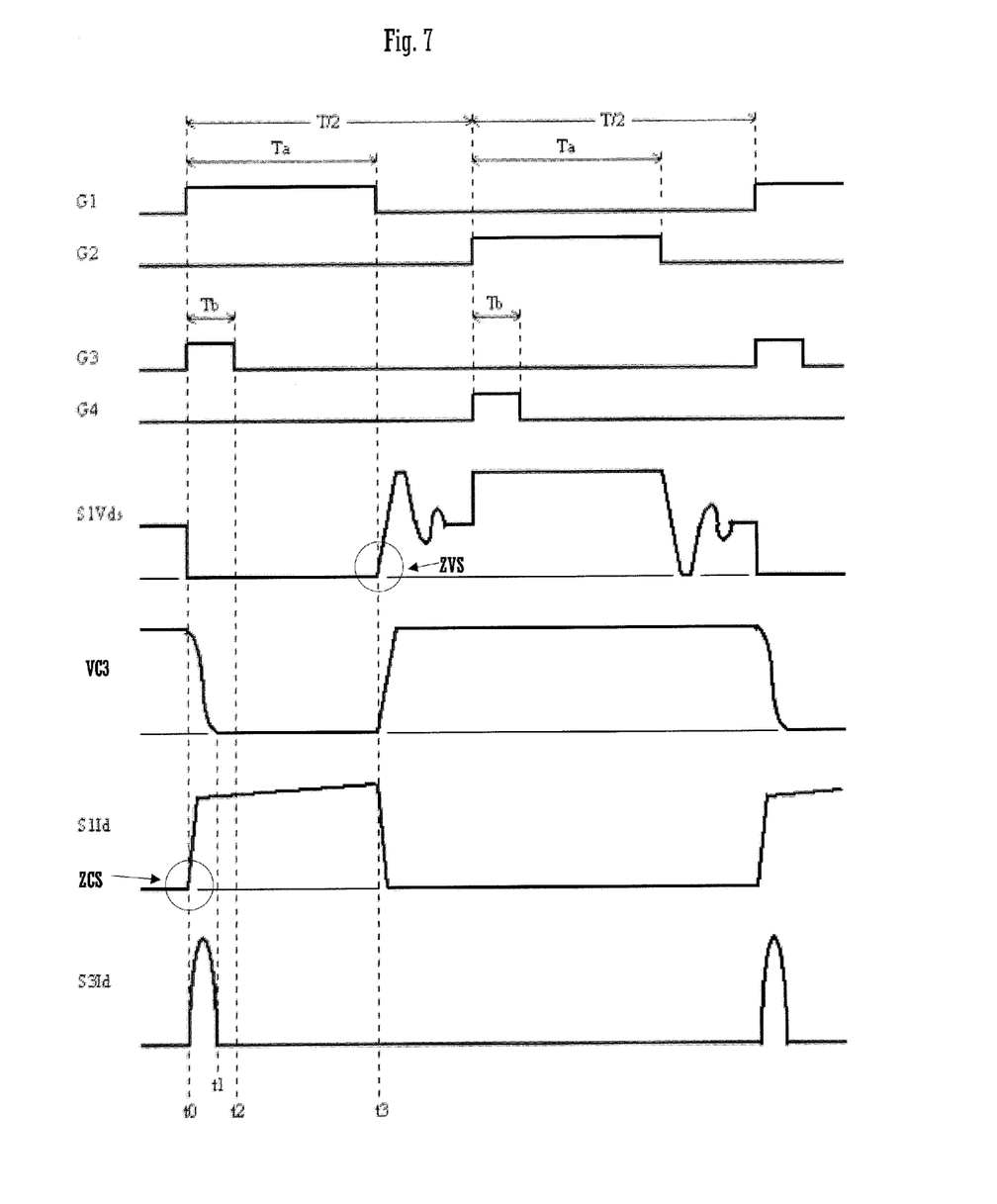
FIG. 7 is a time chart for this DC-DC converter circuit.

FIG. 6 is a circuit diagram of a DC-DC converter circuit which employs a current balanced push-pull type inverter circuit as described above. And FIG. 7 is a time chart for this circuit.

This converter circuit comprises a current balanced push-pull type inverter circuit INV, an output circuit OUT which rectifies the AC output of that inverter circuit INV and outputs it to a load, a first recovery snubber circuit SN1, and a second recovery snubber circuit SN2.

The inverter circuit INV is the same as the circuit shown in FIG. 2 or FIG. 3 (in FIGS. 6 and 3, the shown positions of the capacitors C1 and C2 are mutually opposite). The first recovery snubber circuit SN1 is connected to the first switching element S1 of the inverter circuit INV, and the second recovery snubber circuit SN2 is connected to the second switching element S2. It should be understood that semiconductor switching elements, for example IGBTs or MOS-FETs or the like, are used for the first switching element S1 and the second switching element S2.

The output circuit OUT consists of diodes for rectification D9 through D12 which are connected to the secondary winding S of the transformer T, a reactor L3 for smoothing, and a capacitor C5, and a load $R_O$ is connected to this output circuit OUT.

The first recovery snubber circuit SN1 comprises a first freewheel diode D1 which is connected in inverse parallel with the switching element S1, and a first snubber circuit which is connected in parallel with the switching element S1. This first snubber circuit includes a series circuit of a first snubber diode D3 and a first snubber capacitor C3. Moreover, the recovery snubber circuit SN1 comprises a first recovery circuit which is connected between the positive electrode side of the capacitor C1, which is a first voltage source, and the snubber capacitor C3. This first recovery circuit comprises a third switching element S3, a first reactor L1 which is connected between the switching element S3 and the positive electrode side of the capacitor C1, and a first recovery diode D5 which is connected between the switching element S3 and the snubber capacitor C3.

The second recovery snubber circuit SN2 has the same structure as the first recovery snubber circuit SN1. That is to say, this second recovery snubber circuit SN2 comprises a second freewheel diode D2 which is connected in inverse parallel with the switching element S2, and a second snubber circuit which is connected in parallel with the switching element S2. This second snubber circuit includes a series circuit of a second snubber diode D4 and a second snubber capacitor C4. Moreover, the recovery snubber circuit SN2 comprises a second recovery circuit which is connected between the positive electrode side of the capacitor C2, which is a second voltage source, and the snubber capacitor C4. This second recovery circuit comprises a fourth switching element S4, a second reactor L2 which is connected between the switching element S4 and the positive electrode side of the capacitor C2, and a second recovery diode D6 which is connected between the switching element S4 and the snubber capacitor C4.

This converter circuit also comprises a control unit CT, and this control unit CT generates gate signals G1 through G4 for ON and OFF controlling the switching elements S1 through S4. These gate signals G1 through G4 are respectively supplied to the gate terminals of the switching elements S1 through S4.

Now the operation will be explained with reference to FIG. 7.

The operation of the first recovery snubber circuit SN1 will be explained.

Directly before t0, due to the operation of the reactor L3 which is an electrical current source (and which is connected to the secondary side winding of the transformer T3), the diodes for rectification D9 through D12 are in the freewheeling state. When at t0 the switching element S1 is turned ON, due to the current reduction operation of the leakage inductance of the primary windings P1 (P1$a$ and P1$b$) and P2 (P2$a$ and P2$b$), the electrical current S1Id which flows in the switching element S1 increases linearly at a constant slope. Due to this, the switching operation becomes ZCS (Zero Current Switching) operation.

Furthermore, when the switching element S1 is turned OFF, the snubber capacitor C3 is gradually charged up by the energy which is accumulated in the above described leakage inductance. In the latter half of the charging period, the displacement of the charged potential VC3 of the snubber capacitor C3 becomes determined by the resonant system of the leakage inductance described above and the snubber capacitor C3, and finally is clamped at 2V (the electrical potential of the capacitor C1 is termed V). Due to this, surge voltage is prevented from being applied to the switching element S1, and the voltage S1Vds across the switching element S1 gradually rises, as shown in FIG. 7. Accordingly, the switching operation becomes ZVS (Zero Voltage Switching) operation.

When the switching element S1 is turned OFF, the charge accumulated in the snubber capacitor C3 is not consumed by the snubber resistance as in a prior art type snubber circuit, but rather is recovered in the capacitor C1 which is the first voltage source.

In other words, the switching element S3 is turned ON at the same time that the switching element S1 is turned ON. At this time due to the resonant system consisting of the snubber capacitor C3 and the first reactor L1, the positive electrode portion of the recovery electrical current (the resonance electrical current) based upon the charge in the snubber capacitor C3 (whose electrical potential is 2V) flows in the switching element S3, and the electrical charge described above is recovered to the capacitor C1 (whose electrical potential is V). Since the charged electrical potential 2V of the snubber capacitor C3 is twice the charged electrical potential V of the capacitor C1, accordingly, when the recovery electrical current (the resonance electrical current) has become zero, all of the electric charge in the snubber capacitor C3 is recovered (it is clear that the resonance is eliminated). It should be understood that, due to the charge blocking of the recovery diode D5, the negative electrode portion does not charge up the snubber capacitor C3 for a second time. If the interval until the recovery electrical current which flows in the resonant system described above becomes zero is t0-t1, then the interval over which the switching element S3 is ON is set to Tb (t0-t2), which is longer than this interval t0-t1.

In this manner, when the switching element S1 is turned ON, the charge accumulated in the snubber capacitor C3 is not consumed by the snubber resistance as in a prior art type snubber circuit, but rather is recovered in the capacitor C1 which is the first voltage source; and accordingly it is possible to enhance the efficiency of this inverter circuit.

The operation of the second recovery snubber circuit SN2 is the same as that described above.

Next, a third embodiment of the present invention will be described.

Figure 8:
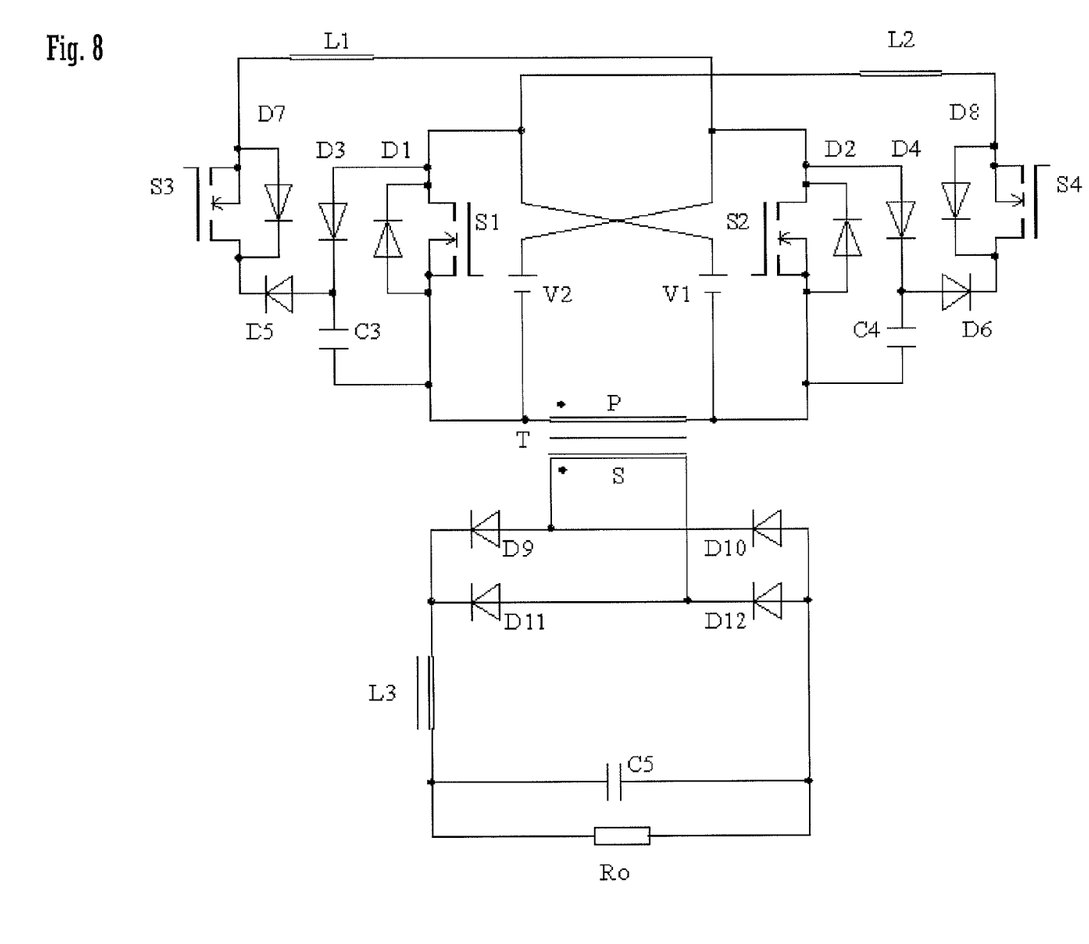
FIG. 8 is a circuit diagram of a DC-DC converter circuit which employs a variant current balanced push-pull type inverter circuit.

FIG. 8 is a circuit diagram of a DC-DC converter circuit which employs a variant of a current balanced push-pull type inverter circuit.

The aspects in which the circuit of FIG. 8 differs from the circuit of FIG. 6 are as follows.

(A1) A current balanced push-pull type inverter circuit having the structure shown in FIG. 1 is used. In other words, instead of the capacitors C1 and C2 being the voltage sources, the first power supply V1 and the second power supply V2 are used.

With this circuit, it is no longer necessary to provide a center tap on the primary winding, and moreover the primary winding may be a single winding.

Next, a fourth embodiment of the present invention will be described.

Figure 9:
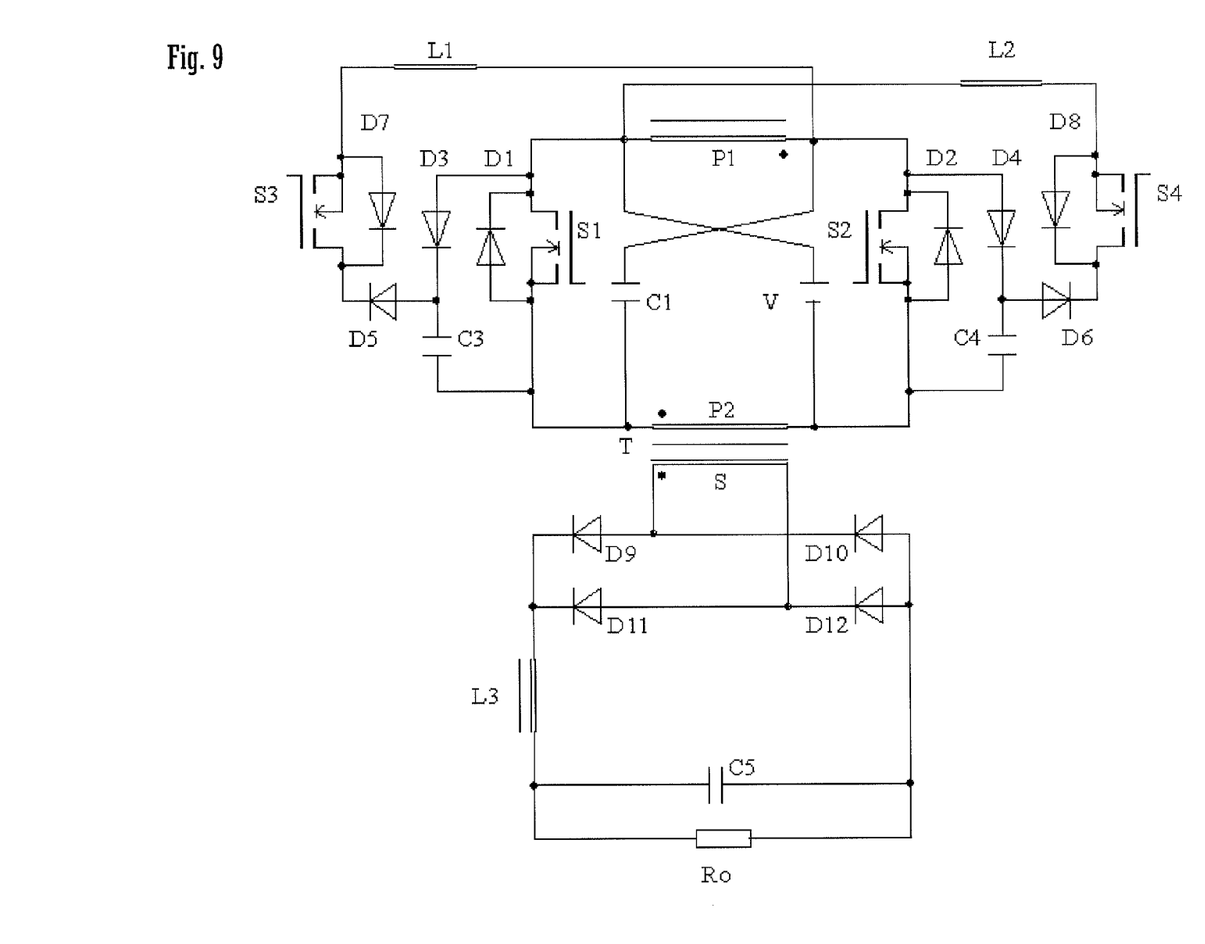
FIG. 9 is a circuit diagram of a DC-DC converter circuit which employs another variant current balanced push-pull type inverter circuit.

FIG. 9 is a circuit diagram of a DC-DC converter circuit which employs another variant of a current balanced push-pull type inverter circuit.

The aspects in which the circuit of FIG. 9 differs from the circuit of FIG. 6 are as follows.

(B1) Instead of the capacitor C2 being the voltage source, the power supply V is used.

(B2) The center tap between the primary windings P1 and P2 is eliminated.

With this circuit, it is no longer necessary to provide a center tap on the primary winding, and moreover a single power supply is sufficient.

Next, a fifth embodiment of the present invention will be described.

Figure 10:
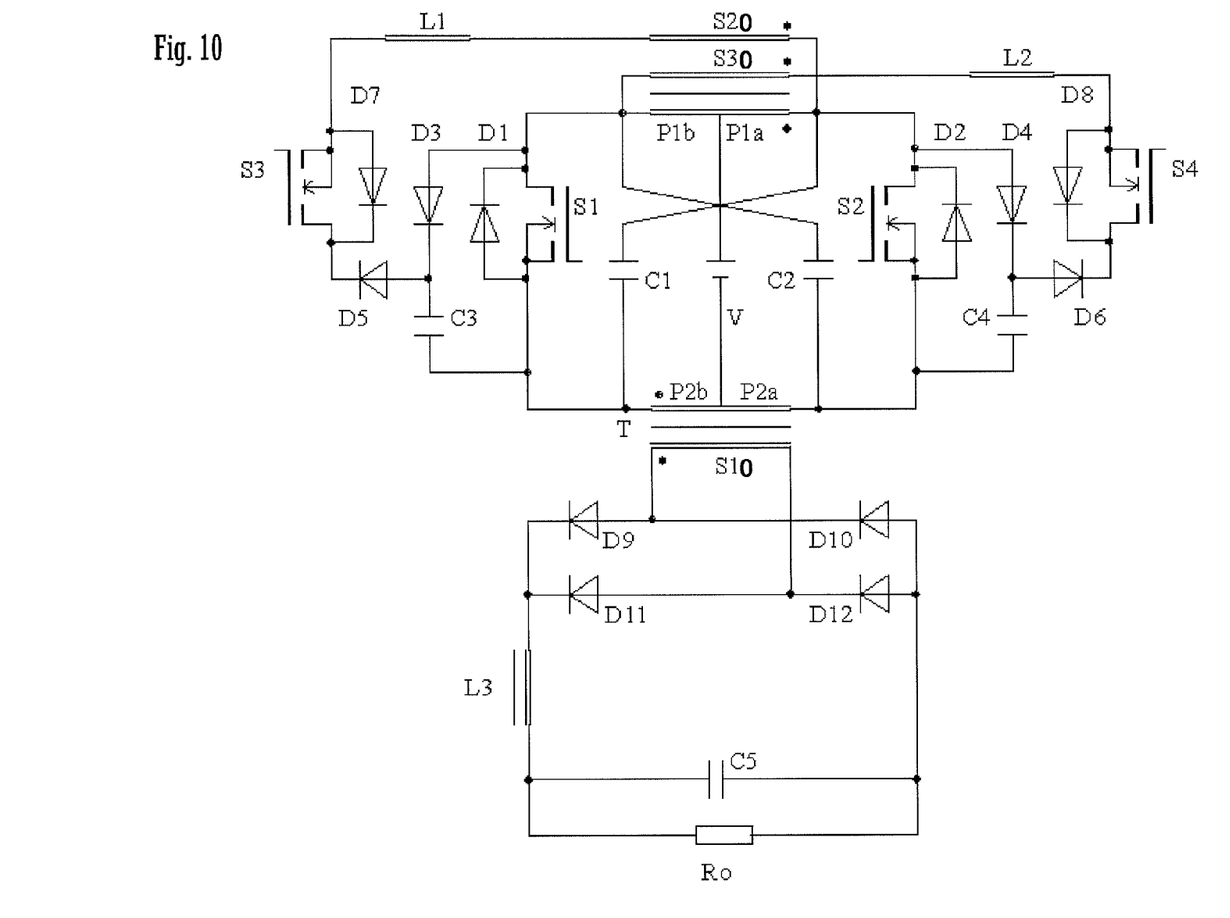
FIG. 10 is a circuit diagram of a DC-DC converter circuit which employs yet another variant current balanced push-pull type inverter circuit.

FIG. 10 is a circuit diagram of a DC-DC converter circuit which employs yet another variant of a current balanced push-pull type inverter circuit.

The aspects in which the circuit of FIG. 10 differs from the circuit of FIG. 6 are as follows.

(C1) A first tertiary winding S20 and a second tertiary winding S30 are provided to the transformer T, and the induction voltage α1 which is generated in this first tertiary winding S20 is added to the charging electrical potential 2V of the snubber capacitor C3 (the charging electrical potential of the snubber capacitor C3 is enhanced). Furthermore, the induction voltage a2 which is generated in the second tertiary winding S30 is added to the charging electrical potential 2V of the snubber capacitor C4.

Since the charging electrical potential of the snubber capacitor C3 is twice the charging electrical potential of the capacitor C1, accordingly ideally the charging electrical potential of the snubber capacitor C3 is perfectly discharged by the switching element S3 being turned ON. However, sometimes it happens that some electrical charge remains in the snubber capacitor C3, due to losses in the recovery circuit and so on, so that ZVS operation is lost. Accordingly, it is arranged to add the induction voltage α1 which is generated in this first tertiary winding S20 to the charging electrical potential 2V of the snubber capacitor C3, so as to promote discharge of the electrical charge accumulated in the snubber capacitor C3.

With any of the embodiments described above, the operation is the same as that of the second embodiment shown in FIG. 6.

Next, a sixth embodiment of the present invention will be described.

Figure 11:
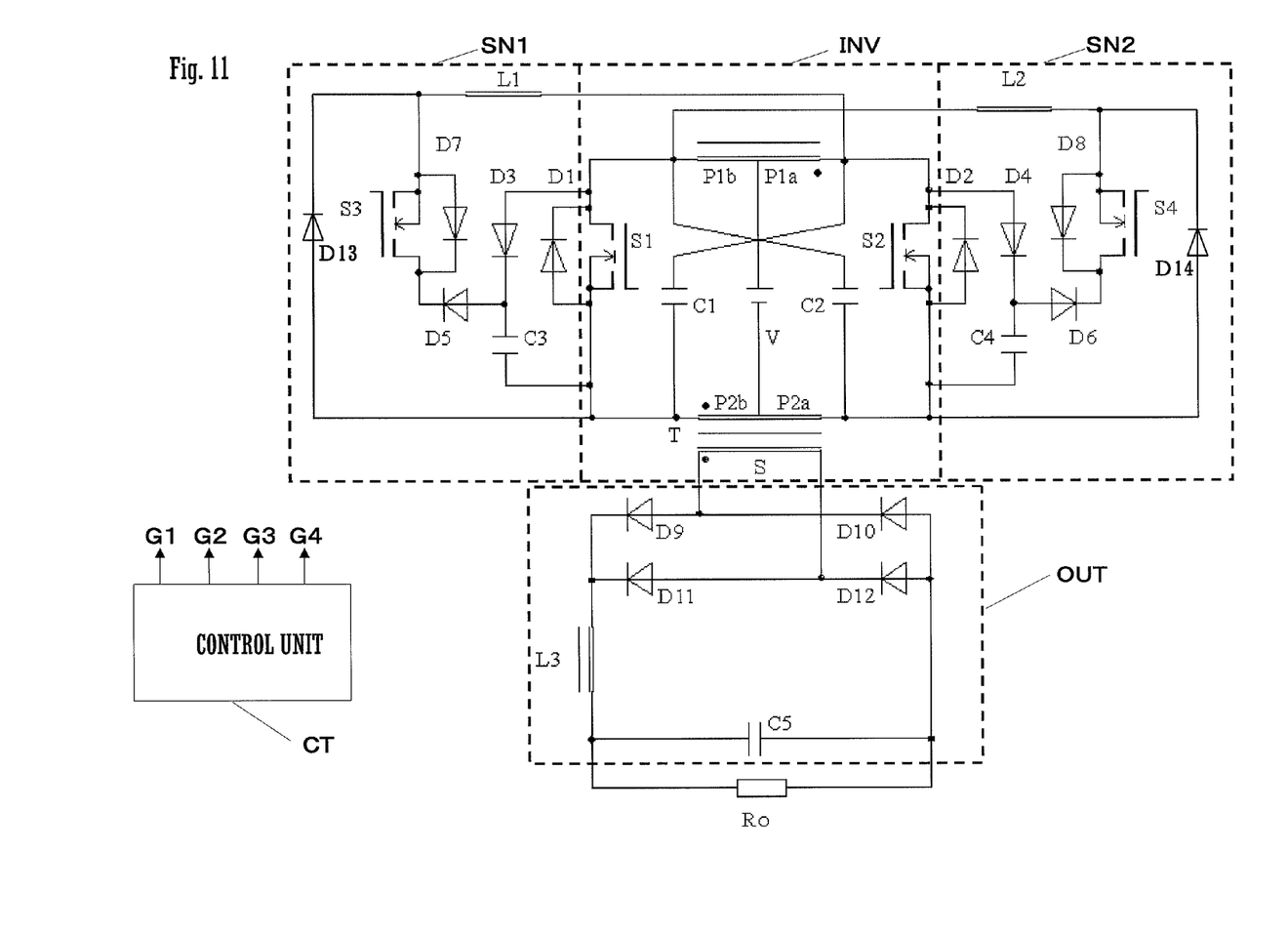
FIG. 11 is a circuit diagram of a DC-DC converter circuit which employs still another variant current balanced push-pull type inverter circuit.

FIG. 11 is a circuit diagram of a DC-DC converter circuit which employs still another variant of a current balanced push-pull type inverter circuit.

The aspects in which the circuit of FIG. 11 differs from the circuit of FIG. 6 are as follows.

(D1) A third freewheel diode D13 is provided to the first recovery snubber circuit SN1, and its anode side is connected to the connection point between the snubber capacitor C3 and the capacitor C1 which is the first voltage source, while its cathode side is connected to the connection point between the first reactor L1 and the third switching element S3. If the switching element S3 is turned OFF while the electrical current which is recovered on the basis of the electric charge accumulated in the snubber capacitor C3 is flowing in that switching element S3, then a surge voltage is applied to the switching element S3 due to the energy which is accumulated in the reactor L1. Accordingly, in this type of case, the current due to the energy described above flows through the freewheel diode D13.

In a similar manner, a fourth freewheel diode D14 is provided in the second recovery snubber circuit SN2 as well.

The invention claimed is:

1. An inverter circuit, comprising:
   a first switching element;
   a second switching element;
   an output transformer comprising a first primary winding connected in series between said first switching element and said second switching element, and further comprising a second primary winding for obtaining an output voltage;
   a first voltage source which is connected between a first connection point at which said first primary winding is connected to said second switching element, and said first switching element, and which applies a voltage to said first switching element via said first primary winding;
   a second voltage source which is connected between a second connection point at which said first primary winding is connected to said first switching element, and said second switching element, and which applies a voltage to said second switching element via said first primary winding; and
   a control unit which alternately turns said first switching element and said second switching element ON and OFF.

2. An inverter circuit according to claim 1, wherein:
   the positive electrode side of said first voltage source is connected to said first connection point;
   the positive electrode side of said second voltage source is connected to said second connection point; and further comprising:

a second primary winding which is connected between the negative electrode side of said first voltage source and the negative electrode side of said second voltage source; and a power supply which is connected between a center tap of said first primary winding and a center tap of said second primary winding, and which supplies energy to said first and second voltage sources via said first primary winding and said second primary winding.

3. An inverter circuit according to claim 1, wherein:

the positive electrode side of said first voltage source is connected to said first connection point;

the positive electrode side of said second voltage source is connected to said second connection point;

and further comprising a second primary winding which is connected between the negative electrode side of said first voltage source and the negative electrode side of said second voltage source;

and wherein either one or both of said first voltage source and said second voltage source is constituted by a power supply.

4. An inverter circuit according to claim 2, comprising:

a first freewheel diode which is connected in inverse parallel with said first switching element;

a first snubber circuit which is connected in parallel with said first switching element, and which includes a series circuit of a first snubber diode and a first snubber capacitor;

a first recovery circuit which is connected between the positive electrode side of said first voltage source and said first snubber capacitor, and which includes a third switching element, a first reactor which is connected between said third switching element and the positive electrode side of said first voltage source, and a first recovery diode which is connected between said third switching element and said first snubber capacitor;

a second freewheel diode which is connected in inverse parallel with said second switching element;

a second snubber circuit which is connected in parallel with said second switching element, and which includes a series circuit of a second snubber diode and a second snubber capacitor; and a second recovery circuit which is connected between the positive electrode side of said second voltage source and said second snubber capacitor, and which includes a fourth switching element, a second reactor which is connected between said fourth switching element and the positive electrode side of said second voltage source, and a second recovery diode which is connected between said fourth switching element and said second snubber capacitor;

and wherein said control unit performs control to turn said third switching element ON within the ON interval of said first switching element, and control to turn said fourth switching element ON within the ON interval of said second switching element, and thereby the electrical charge which has been accumulated in said first and second snubber capacitors is recovered to said first voltage source and said second voltage source respectively.

5. An inverter circuit according to claim 4, wherein:

said first recovery circuit comprises a third freewheel diode, and the anode side of said third freewheel diode is connected between a connection point between said first snubber capacitor and said first voltage source, while the cathode side of said third freewheel diode is connected between a connection point between said first reactor L1 and said third switching element S3; and said second recovery circuit comprises a fourth freewheel diode, and the anode side of said fourth freewheel diode is connected between a connection point between said second snubber capacitor and said second voltage source, while the cathode side of said fourth freewheel diode is connected between a connection point between said second reactor and said fourth switching element.

* * * * *